United States Patent
Lee

(12) United States Patent (10) Patent No.: US 8,295,368 B1
Lee (45) Date of Patent: Oct. 23, 2012

(54) METHOD AND APPARATUS FOR IMPROVED INTERFACING OF CONNECTIONS BETWEEN A MULTIPLICITY OF HANDHELD DEVICES

(75) Inventor: Hanjin Lee, Skillman, NJ (US)

(73) Assignee: Koamtac, Inc., Princeton, NJ (US)

( * ) Notice: Subject to any disclaimer, the term of this patent is extended or adjusted under 35 U.S.C. 154(b) by 722 days.

(21) Appl. No.: 12/384,022

(22) Filed: Mar. 31, 2009

(51) Int. Cl.
*H04B 3/00* (2006.01)
*H04L 25/00* (2006.01)

(52) U.S. Cl. ........................................ 375/257; 375/316

(58) Field of Classification Search .................. 375/257, 375/316
See application file for complete search history.

(56) References Cited

U.S. PATENT DOCUMENTS 3,566,149 A * 2/1971 Paradissis ..................... 307/107
5,602,499 A * 2/1997 Shou et al. ..................... 327/75

* cited by examiner

*Primary Examiner* — Shuwang Liu
*Assistant Examiner* — Nader Bolourchi
(74) *Attorney, Agent, or Firm* — Robert Gorman; Gorman Law Offices

(57) ABSTRACT

A system and method for the provision of communication across multiple devices in a multiplicity of communication environments, whether in a serial interface environment, or whether used in Bluetooth protocol-based devices, as well as in other communication devices, (ZigBee/WiFi/Wimax, etc.) that normally cannot readily establish such data exchange. The invention accomplishes this through inventive techniques and a circuit that uses multi-state voltage levels to multiplex RS232 communication between at least two, but normally three or more RS232 devices. To this end, the present invention enables a device having RS232 connection between at least two sub-systems, while each sub-system communicates with other external RS232 devices using same RS232 connection between at least two sub-systems.

4 Claims, 4 Drawing Sheets

FIG. 3

| Serial_DET# (201) | (202) | (203) | (210) | (211) | (212) | Note |
|---|---|---|---|---|---|---|
| 3.3V | 0 | 0 | 0 | 0 | 0 | SDA – SDB |
| 0.0V | 0 | 1 | 1 | 0 | 1 | SDA – SDC |
| 5.0V | 1 | 0 | 0 | 1 | 0 | SDB – SDC |
|  | 1 | 1 | 0 | 0 | 0 | Illegal State |

METHOD AND APPARATUS FOR IMPROVED INTERFACING OF CONNECTIONS BETWEEN A MULTIPLICITY OF HANDHELD DEVICES

BACKGROUND OF THE INVENTION

1. Field of the Invention

The present invention relates generally to an inventive approach for improving the interfacing of connections between a multiplicity of handheld electronic units such as cell phones, etc. that may have the need for add-on units to be connected thereto. Such devices may include barcode scanners, PDAs, printers, scanners, and the like.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Hand held units such as computers, cell phones, personal digital assistants (PDAs) etc are becoming increasingly useful amongst consumers and industry. In certain applications, such hand held units may utilize the RS232 standard, a standard which has been in existence since 1969, yet it is still used in many types of equipment manufactured today. In such applications, the RS232 standard may be utilized for serial binary data signals connecting between DTEs (Data Terminal Equipment) and a DCEs (Data Circuit-terminating Equipment).

Usually in such applications, a given DTE device may be established as the terminal while the DCE may be a modem, where a "null" modem scheme is employed as a communication method to connect two DTEs directly using a cross-linked connection between transmit (TX) and receive (RX) lines in RS232 serial cable. In doing so, many DTEs have eliminated the various signals defined in the standard and reduced the interface to a three wire interface using TxD (transmitted data), RxD (received data) and Ground. One such application is the R232 serial interface available on mobile terminals such as cellular phones and PDAs. This interface can be used to communicate with other devices on a three wire connection, however known systems in this regard offer significant drawbacks, not the least of which is the fact that the RS232 scheme is a point to point communication protocol whereby multiple devices (especially three or more devices) cannot communicate at the same time.

Prior art attempts to address such limitations may be seen in documents such as U.S. Pat. Nos. 4,607,379, 5,675,524, and 5,497,339, each of which are hereby incorporated by reference in their entireties, offer only crude solutions for attempting to establish device connections interfaces for sending data. To this end, related prior art solutions have been hitherto limited to the provision of point-to-point communication between separate RS232 ports, without the ability to seamlessly connect more than two devices, given that there are no additional signal lines available in the RS232 standard. Given the various drawbacks related to the usage of a point-to-point set-up such as RS232, there is clearly a need to provide for a more simplified, single RS232 port system that works within the limitations of multiple connectivity set-ups, without the any drawbacks. As such, it would be most desirable if only one problem-free interface could be capable of establishing RS232-type communications between a base unit and two, three or more additional devices while using only one common port.

SUMMARY OF THE INVENTION

The present invention allows devices that have only one RS232 port to be able to communicate with two, three or more independent devices, something which previously would have been limited to point to point communication through the RS232 ports between only two devices. The present invention also provides for R232 communication between more than two devices without any interference that might stem from technical issues such as miscommunication and signal conflicts, and accomplishes the aforementioned without any increase in either the cost or complexity of multiple device communications.

The present invention therefore comprises, in one illustrative implementation, an improved system and method whereby any number of handheld DTE or DCE devices (whether barcode reader, cell phone, PDA or other associated device) might be connected to any number of handheld DTEs or DCEs in such a way that they could all be easily interfaced without the need for say, multiple RS232 ports, all while avoiding signal conflicts or other technical issues. This is accomplished by using, among other things, an inventive circuit that uses multi-state voltage levels (via a multi-state switch) to multiplex RS232 communication between three or more RS232 devices. Provision of such may be employed across multiple devices in a multiplicity of communication environments, whether in a wired serial interface environment, or whether used in wireless environments, such as Bluetooth protocol-based devices, and other communication devices (e.g. those based on protocols such as ZigBee/WiFi/Wimax, etc.) that normally cannot readily establish such data exchange between each other. To this end, the invention comprises, at one level, a system for the provision of communication across multiple DTE/DCE devices in a multiplicity of communication environments comprising: a multi-state voltage switching circuit, wherein the multi-state voltage switching circuit is situated proximate to a group of DTE/DCE devices, such that the multi-state voltage switching circuit may include an electrical connection for connecting to any of at least two DTE/DCE devices to each other within a group of DTE/DCE devices via each respective ports Of the at least two DTE/DCE devices; and
a switch contained within the multi-state voltage switching circuit having predetermined switch settings for an establishment of a communication route between the at least two DTE/DCE devices. In a further embodiment, the multi-state voltage switching circuit of may also comprise: a logic-based structure associated with the multi-state voltage switching circuit, the logic-based structure including auto-detect circuitry for generating an Auto Detection Output Signal upon the reception by the auto-detect circuitry of at least one Detect Signal transmitted from a serial interface circuit within the at least one DTE/DCE device, and wherein the switch may have at least three predetermined switch settings based upon assigned voltage increments. Furthermore, the auto-detect circuitry can be configured to receive the at least one Detect Signal from said at least one DTE/DCE device, in either a wired or wireless environment.

Although certain aspects commensurate in scope with the disclosed embodiments are set forth below, it should be understood that these aspects are presented merely to provide the reader with a brief summary of certain forms the invention might take and that these aspects are not intended to limit the scope of the invention. Indeed, the invention may encompass a variety of aspects that may necessarily not be set forth below, but may instead be appreciated by one skilled in the art.

BRIEF DESCRIPTION OF THE DRAWINGS

The foregoing and other advantages of the invention will become apparent upon reading the following detailed description and upon reference to the drawings in which:

FIG. 3 depicts an exemplary logic diagram representing the range of signal codes that might be employed within an exemplary implementation of the present invention.

DETAILED DESCRIPTION OF SPECIFIC EMBODIMENTS

Figure 1:
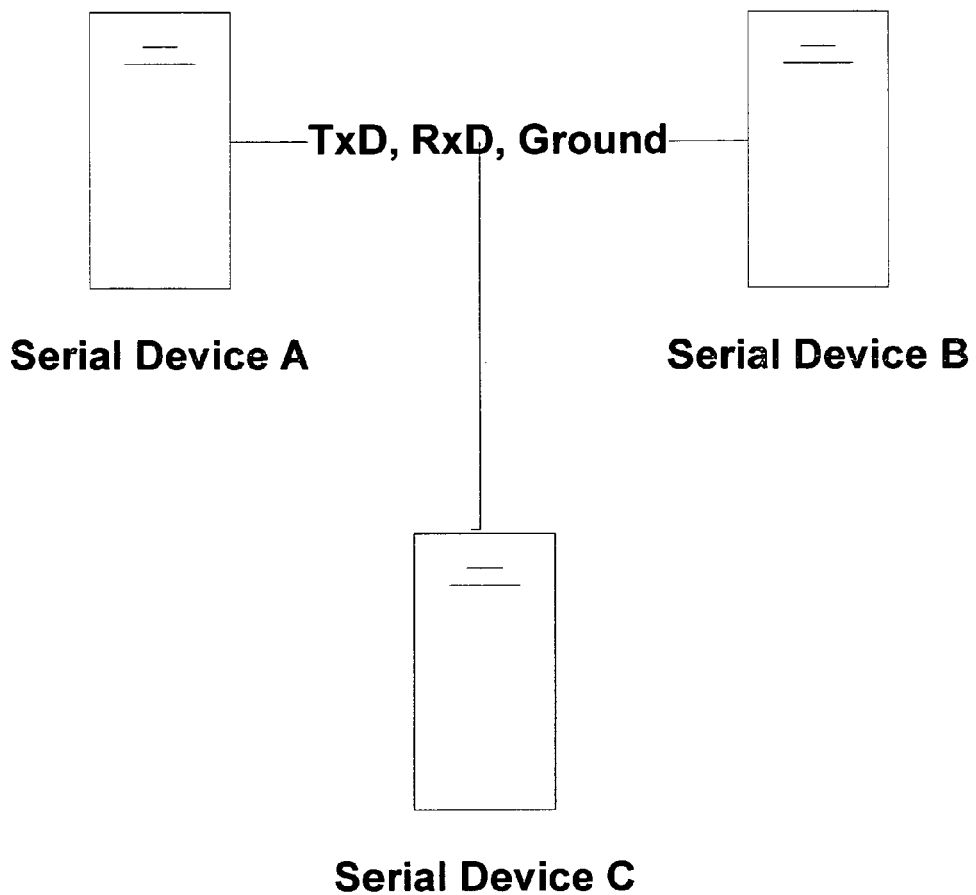
FIG. 1 depicts a general illustration of one embodiment of the inventive connection between any two of a multiplicity of DTE/DCE devices or handheld unit (such as a personal digital assistant (PDA), cell phone, bar code reader, etc.), where three serial devices would share one set of TxD, RxD and Ground signals, in such a way as to multiplex three pairs of "Serial Device A—Serial Device B", "Device A—Serial Device C", "Device B—Serial Device C"
Figure 1:
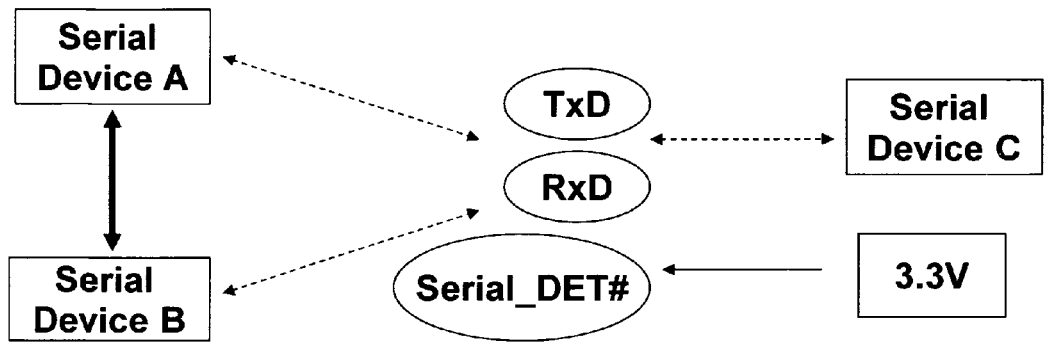
Figure 1:
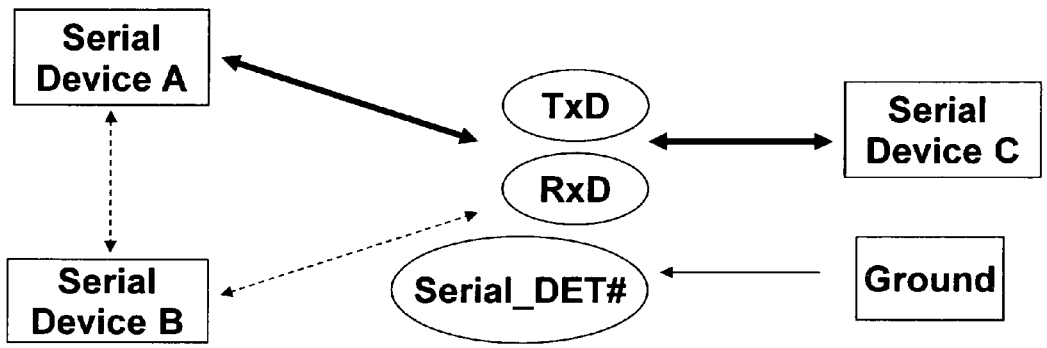
Figure 1:
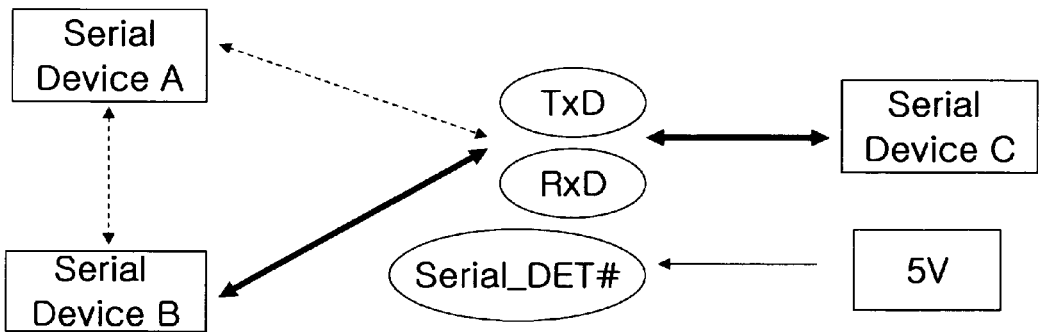

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made in order to achieve the developers' specific goals (such as compliance with system-related and business-related constraints), any of which may vary from one implementation to another. Moreover, it should be appreciated that such additional developments might be complex and time consuming, but would nevertheless be a routine undertaking of design, fabrication, and manufacture for those of ordinary skill having the benefit of this disclosure.

Accordingly, the present invention introduces a new system and method that can be used to innovatively multiplex either wired and/or wireless connections between multiple handheld devices without the need for multiple ports. This invention has various embodiments and includes the provision for such advantages among various communication protocols including USB, Serial and Bluetooth, as well as newer communication protocols, such as ZigBee, WiFi and WiMax.

In accordance with one aspect of the present invention, there is provided, at the broadest level, a unified connection interface comprising: multi-state voltage circuitry including a switch therein, wherein the multi-state voltage circuitry is situated proximate to a plurality of DTE/DCE devices and contains an electrical connection for connecting the multi-state voltage switch to at least one port of each of any of such plurality of DTE/DCE devices, said switch comprising a plurality of switch settings approximately equal to the total number of said plurality of DTE/DCE devices. Further provided may be a logic-based structure contained within the multi-state circuitry, the logic-based structure providing for genera- tion of an Output Signal upon the reception by auto-detect circuitry of at least one Detect Signal transmitted from a serial interface circuit within the at least one DTE/DCE device. Said auto-detect circuitry may further be configured so as to provide for data exchange between at least two (but normally three or more) DTE/DCE devices in addition, and may further be configured so as to receive said at least one Detect Signal from the at least one DTE/DCE device, whether wired or wireless, and may include at least a TxD line, an RxD line and a null modem. When provided in this manner, the multi-state circuitry may also be further configured so as to generate a power signal that changes to one of several distinct level signals, wherein the logic-based structure contained within the auto-detect circuitry has built in logic to detect the change to the channeled signal. Although other standards may be utilized within the scope of the present invention, the RS232 standard, or "RS232" is illustratively used throughout as one standard for serial binary data signals connecting between three or more DCEs or other DTEs.

To this end, the multi-state circuitry may be contained, in one embodiment, within or proximate to any given DTE/DCE device (and such DTE/DCE device may or may not, depending on user needs, be further designated as a "base" or "host" DTE/DCE device as needed). Alternatively in an alternative embodiment, the multi-state circuitry may be self contained, as a stand-alone unit or hub that may be situated proximate to any grouping of given DTE/DCE devices. In any case, a connection between all of the connected device(s) may be made either through a cable (such as a cable chosen from the group of class D-sub cables) or other means, such as wireless connections, wherein the TxD line and said RxD line are connected through said connector and are powered by a device power signal and are grounded by a device ground signal. The multi-state circuitry may also provide for a connect/disconnect signal upon connection and disconnection between the TxD line and the RxD line.

Therefore, in one illustrative embodiment of the present invention, provision may further be made for said communicative establishment of multiple serial devices through the use of multi-state circuitry including a multi-level voltage switch for connecting through the RS232 port of any DTE or DCE devices that one desires to collect as a group or network. In any case, these device may use a cross-linked connection between transmit (TxD, or transmitted data) lines, null modem lines, and receive (RxD or received data) lines in an RS232 serial cable. To this end, the present invention enables a device having RS232 connection between two sub-systems, while each sub-system communicates with other external RS232 devices using same RS232 connection between two sub-systems. Although other types of electrical connectors other than D-sub may be employed within the scope of the invention, for illustrative purposes, when discussing certain embodiments, the disclosure herein may be directed to D-sub cables, either to DB25 (e.g. 25-pin D-sub), or for applications where less common signals can be omitted, a DB9 (e.g., 9-pin D-sub) may also be utilized.

Figure 2:
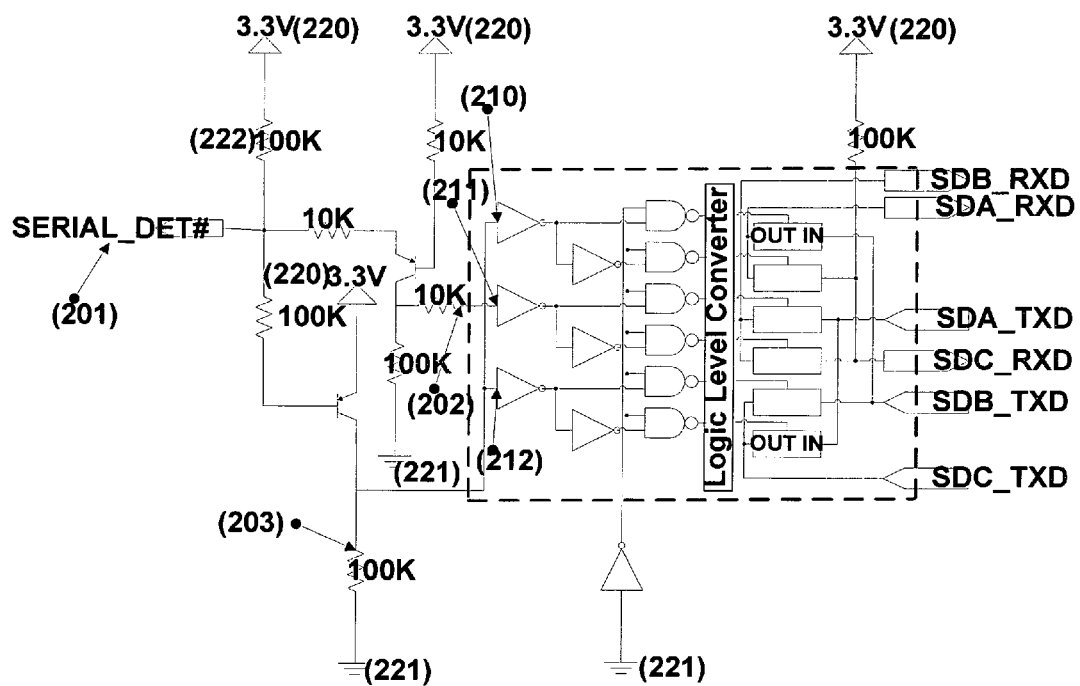
FIG. 2 depicts a more specific circuit level illustration of one embodiment of the inventive connection between any two of a multiplicity of DTE/DCE devices or handheld unit (such as a personal digital assistant (PDA), cell phone, bar code reader, etc.), wherein a serial connection may determine signals with three different voltage levels that will multiplex the three serial pairs.

With general reference then to FIGS. 1 and 2, in one embodiment of the present invention, the multi-state circuitry and switch is situated within or proximate to at any number of DTE/DCE devices so as to be able to interface with existing device circuitry as described herein. This circuitry provides the logic for multi-state voltage switching and logical processing, and may be provided for so as to have an immediate or other electrical connection with the connection port of each DTE/DCE device in a given connected group. In other apporaches, one would normally need "n" signals to multiplex (distinguish) ($2^n$) devices (e.g. 3 or 4 devices would need 2 signals to multiplex (distinguish) 2 out of 3 or 4 devices, but by contrast, the present invention utilizes merely one signal (Serial_DET) with three different voltage level to distinguish the same illustrative 2 out of 3 devices. It is important to note that multiple levels of voltage switching are explicitly contemplated by the present invention so that one may connect any number of connected devices with each other as needed, merely by modifying the circuit and switch to accommodate more incremental voltage levels. Thus if one desired to connect say, four DTE/DCE devices to each other in a given group, one would construct a quad-voltage switch having four discrete voltage level settings, with the corresponding voltage increments in the switch settings equating to a connection setting between any two of the four DTE/DCE devices.

To this end, one illustrative embodiment of the present invention has been depicted, for purposes of simplicity of discussion, as a tri-state voltage logic (e.g., three connected devices in a given group). Accordingly, FIGS. 1 and 2 illustratively depict merely one exemplary embodiment of the present invention where there is an illustrative tri-state voltage based circuit and (three position) switch that is capable of accommodating the connection of any two of the group of three DTE/DCE devices. The switch itself provides the advantage of allowing all three of the DTE/DCE devices to be "relationally" connected at the same time wherein the actual communicative signal connection may be established between any two of the three at any given time merely by setting the switch to one of its three preset settings that correspond to each possible permutation of connections between any two devices. Thus, the switch may be manually operated by a user so as to select one of say, three switch positions corresponding to one of three voltage levels, where each respective voltage level will correspond to voltage increments of say, 0 v, 3.3V or 5V, such that each selected voltage level will switch on a respective pairing of any two devices (e.g., A↔B, A↔C, B↔C, as depicted in FIG. 1).

Thus, FIG. 1 depicts one illustrative example of the inventive circuitry contemplated by the present invention, where the "Serial_DET#" is a tri-stage voltage signal such as "0V", "3.3V" or "5V", as configured by the respective voltage indication on the multi (tri) level switch. Eight signal lines are used in this example: (i) SDA_TxD(TX); (ii) SDA_RxD (RX); (iii) SDB_TxD(TX); (iv) SDB_RxD(RX); (v) SDC_TxD(TX); (vi) SDC_RxD(RX); (vii) G (Common Ground); and (viii) a Serial_DET# multi-state voltage signal. As such, for the purposes of the continuing example depicted in FIG. 2, assume that DTE-A, DTE-B and DTC-C should communicate each other using shared TxD and RxD line, such that:

AB: Null modem between DTE-A and DTE-B
BC: Null modem between DTE-B and DTE-C
AC: Null modem between DET-A and DTE-C Continuing with the illustrative assumption that Serial_DET# is tri-states voltage signal, a given Serial_DET# signal can multiplex AB, BC and AC in such a fashion whereby the switch will allow the circuit to connect devices and signals to process as follows:

(1) If Serial_DET# (201) is switched to the "0V" setting, then signal (202) becomes logic low and signal (203) becomes logic high. This enables signals (210) and (212) become logic high and allows serial device A and serial device C communicate each other.

(2) If Serial_DET# (201) is switched to the "3.3V" setting, then signals (202) and (203) become logic low. This makes all three signals (210), (211) and (212) become logic low and allows serial device A and serial device C communicate each other.

(3) If Serial_DET# (201) is switched to the "5V" setting, then signal (202) becomes logic high and signal (203) becomes logic low. This enables signal (211) becomes logic high and allows serial device B and serial device C communicate each other.

Thus, as specifically depicted in FIG. 2, which depicts an exemplary circuit diagram of the present invention, wherein: SDA_TXD, SDB_TXD and SDC_TXD indicate the Transmit Data Signal of DTEs; SDA_RXD, SDB_RXD and SDC_RXD indicate the Receive Data Signal of DTE; 3.3V indicates the Device power signal; (201) indicates the Serial_DET signal. (210), (211) and (212) indicate the multiplexer channel selection signals. (220) is 3.3V power signal and (221) is 0V ground signal. To this end, the illustrated circuit may be placed inside the DTE unit and may be connected to the DCE or other DTE unit by a cable that interfaces on SDA_TXD, SDB_TXD and SDC_TXD Transmit Data Signal of DTEs and SDA_RXD, SDB_RXD and SDC_RXD Receive Data Signal of DTEs. When configured as such, Serial_DET# (201) "0V" setting enables signals (210) and (212) to become logic high and accordingly allows serial device A and serial device C communicate each other. Where Serial_DET# (201) is switched to the "3.3V" setting, this would enable all three signals (210), (211) and (212) to become logic low and would allow serial device A and serial device C to communicate each other. Where Serial_DET# (201) is switched to the "5V" setting, this enables signal (211) becomes logic high and allows serial device B and serial device C to thereby communicate with each other. In accordance with the above, the null modem may therefore connect the DTE and other DTE or DCE. In implementing this, the cable utilized therewith may ideally be selected from electrical connectors, such as those known as the class of D-sub cables or connectors. When provided as such, the present invention offers the advantages of not needing external or additional power like USB-type circuitry, and needs no additional software on devices like cell phones, PDAs etc.

To that end, when the above structure may further be expressed in terms of an inventive method having discrete sub-processes or steps, and as such, the following exemplary particulars may be described:

1. At the outset, the DTE device has a power-ground circuit which maintains a logic "high" level if the power-grounded serial cable is not connected with DCE or other DTE device;
2. Upon plugging in the power-grounded serial cable in both devices, the DTE device power-ground signal changes the logical signal level to "0" from "1";
3. As a result, the DTE device controller will detect the power-ground signal level change, and will perform predefined operations, such as automatic data transmission to DCE or other DTE;
4. Subsequently, the power-ground signal changes the logic signal level to "1" once the power-grounded serial cable is unplugged; and
5. Thereafter, the DTE device controller detects the aforementioned power-ground signal level change, and performs predefined operations.

One illustrative instantiation of the invention is therefore shown with the coupling of an exemplary DTE device such as a bar code reader, together with another DTE or other DCE device such as a cell phone or PDA. Although other auxiliary devices besides a barcode reader may be connected to many different types of handhelds (such as PDAs or cell phones), these types of devices will be used merely for simplicity of illustration, and are not meant to be limiting in any way:

A. The exemplary bar code reader has power signal in the interface;
B. The exemplary bar code reader custom cable would connect the power signal of the exemplary bar code reader to the ground signal of serial devices, such as cell phones, PDAs, etc.;
C. The exemplary bar code reader power signal would become ground level and exemplary bar code reader has a built in logic to detect this change;
D. This power to ground signal change detection enables exemplary aware of the connection to the other serial devices such as cell phone and PDA;
E. Now, the exemplary bar code reader can execute a transmission command automatically to the serial devices such as cell phone and PDA.

In the above example then, Serial_DET# (201) would be pulled to ground once a cable is plugged into both devices. When provided as such, the DTE can detect the connection of DCE by monitoring the change of voltage of signal "A". The following signal lines are used in this illustrative example: (1) TxD(TX), (2) RxD(RX), (3) G(Common Ground) and (4) and peripheral interface signal line, such as a Serial_DET#:

In the illustrative Serial_DET# (201) signal, the signal is logic "high" if the external serial device is not connected because register (222) pulls the signal "high" when there is no connection to it.

In such an illustration, the Serial_DET# (201) signal becomes logic "low" once an external serial device is connected and Serial_DET# (201) is pulled to ground level by grounded peripheral interface signal line.

Using this technique, a first device can be designed that interfaces to a second device with a serial communication interface and automatically detects the connection. The second device only needs TxD and RxD lines, but may also require two pins that have ground connections on them. In this exemplary embodiment, the first device would therefore preferably be designed with TxD, RxD, Serial Detect, and Ground lines.

In relation to the above particulars, FIG. 3 therefore illustrates a logic table view of a multiplexing perspective that might be employed within the implementation of one embodiment of the present invention. Thus, the Table depicted in FIG. 3 exemplifies the range of established signal codes from a DTE/DCE perspective that might be employed within the implementation of one embodiment of the present invention. When provided as such, this inventive logic indicates a method that can be used establish communication between three DTEs by using an additional multi-state voltage signal.

As mentioned above, the present invention may be used in a multiplicity of wired and wireless environments, over different communication protocols, including Bluetooth, ZigBee, WiFi and/or WiMax. Although each of these implementations may be provided for in substantially the same fashion as described above, with the wired-based implementation utilizing the aforementioned "Power-Ground Signal" ("Detect Signal"), and with wireless-based implementations utilizing the equivalent "Detect Signal", which may also be referred to as a "connected/disconnected signal", and is used in wireless protocols such as Bluetooth, ZigBee, WiFi and/or WiMax. Whichever specifics are employed within the inventive framework described herein, the exchange of data between devices is provided for through the aforementioned predefined procedures, once the inventive detection of connections has been automatically provided for therein.

Although the practical applications of the above are legion, in one embodiment the illustrative application of the invention to cell phones may prove especially useful. For example, it may be possible to utilize cell phones for more than just voice communications. To this end, cell phones may prove to be useful, versatile mobile terminals, which, with the advent of the present invention, may mean cellular phones provided with serial (or other peripheral communications) interfaces so as to provide DCE and DTE capability. When provided in accordance with the present invention, it may accordingly become quite popular to use cellular phones also for data processing through the provision of interoperability with diverse input and output devices, such as barcode and RFID readers that can be connected to cellular phones. It is therefore contemplated that at least one potential application of the invention disclosed herein may be applied in order to enhance mobile computing application through the provision of interoperability between a given cell phone and diverse input devices (barcode scanners, optical devices, scanners, medical diagnostics devices, electronic diagnostic devices, automotive diagnostic devices, power and utility meter readers, personal computers, portable memory drives, audio or visual equipment, police investigative devices such as breathalyzers and the like, and many other possible applications) together with diverse output devices (printers, personal computers, data uplinks, diagnostic interfaces for medical, automotive, and electronic devices, data analyzers, audio or visual equipment, police investigative devices such as breathalyzers and the like, and many other possible applications), all of which can begin the transmission of data to cellular phones automatically, once connected to the given cellular phone through the inventive system and method.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for the provision of communication across multiple Data terminal Equipment (DTE)/Data Circuit-terminating Equipment (DCE) serial devices in a multiplicity of communication environments comprising:

a multi-state switching circuit, wherein said multi-state switching circuit is situated proximate to a group of DTE/DCE devices, said multi-state switching circuit including an electrical connection for connecting to any of at least two DTE/DCE devices to each other within said group of DTE/DCE devices via each respective port of said at least two DTE/DCE devices, said multi-state switching circuit having a voltage logic which employs only one signal with multiple different voltage levels set according a total number of said multiple DTE/DCE devices; and said multi-state switching circuit having predetermined switch settings equal to said total number of said multiple DTE/DCE devices for an establishment of a communication route between said at least two DTE/DCE devices.

2. The multi-state switching circuit of claim 1 further comprising:

a logic-based structure associated with said multi-state switching circuit, said logic-based structure including a logic level converter for generating an Auto Detection Output Signal upon the reception by said logic level converter of at least one Detect Signal transmitted from a serial interface circuit within said at least one DTE/DCE device.

3. The multi-state switching circuit of claim 2 wherein:
said multi-state switching circuit has at least three predetermined switch settings, each of said at least three predetermined switch settings having assigned respective voltage indications so as to switch on a respective pairing of any two devices using one shared signal.

4. The multi-state switching circuit of claim 3 wherein:
said logic level converter is configured in a wireless based implementation to receive said at least one Detect Signal from said at least one DTE/DCE device across wireless protocols chosen from the group consisting of Bluetooth, ZigBee, WiFi, or WiMax.

* * * * *